(12) United States Patent
Zhong et al.

(10) Patent No.: US 10,749,559 B2
(45) Date of Patent: Aug. 18, 2020

(54) WIDE BAND RECEIVER FRONT END FOR ROTATIONAL SPECTROSCOPY

(71) Applicant: Board of Regents, University of Texas, Austin, TX (US)

(72) Inventors: Qian Zhong, Dallas, TX (US); Kenneth K. O, Plano, TX (US); Wooyeol Choi, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 663 days.

(21) Appl. No.: 15/628,363

(22) Filed: Jun. 20, 2017

(65) Prior Publication Data

US 2017/0366214 A1    Dec. 21, 2017

Related U.S. Application Data

(60) Provisional application No. 62/352,117, filed on Jun. 20, 2016.

(51) Int. Cl.
| | | |
|---|---|---|
| *H04B 1/3827* | (2015.01) | |
| *H04B 1/40* | (2015.01) | |
| *G01J 3/00* | (2006.01) | |
| *G01J 3/42* | (2006.01) | |

(52) U.S. Cl.
CPC ............ *H04B 1/3827* (2013.01); *H04B 1/40* (2013.01); *G01J 3/00* (2013.01); *G01J 3/42* (2013.01)

(58) Field of Classification Search
CPC .. G01J 3/00; G01J 3/42; H04B 1/3827; H04B 1/40
See application file for complete search history.

(56) References Cited

U.S. PATENT DOCUMENTS

| | | | | |
|---|---|---|---|---|
| 7,376,403 B1* | 5/2008 | Wanke | ............... | H01L 29/205 257/19 |
| 7,420,225 B1* | 9/2008 | Wanke | ............... | B82Y 10/00 257/184 |
| 8,748,822 B1* | 6/2014 | Gerecht | ............... | G01J 3/42 250/339.07 |
| 2012/0181431 A1* | 7/2012 | Mitin | ............... | G01N 21/3581 250/338.4 |
| 2016/0131600 A1* | 5/2016 | Pate | ............... | G01N 22/00 250/339.08 |

OTHER PUBLICATIONS

E. Ojefors, et al., "Active 220- and 325-GHz Frequency Multiplier Chains in an SiGe HBT Technology," IEEE Transactions on Microwave Theory and Techniques, May 2011, pp. 1311-1318, vol. 59, No. 5.

(Continued)

*Primary Examiner* — Marcus H Taningco
(74) *Attorney, Agent, or Firm* — Schott, PC.

(57) ABSTRACT

A receiver receives a wide band signal in a range comprising a front end to the receiver including a complementary metal-oxide-semiconductor (CMOS). The CMOS includes a dipole antenna that receives a received signal; a hybrid-based broadband isolation structure that receives the received signal and a local oscillator LO signal and passes through the LO signal to a sub-harmonic mixer. The sub-harmonic mixer mixes the received signal with the local oscillator signal to generate an intermediate frequency (IF) signal to the hybrid-based broadband isolation structure.

20 Claims, 5 Drawing Sheets

(56) References Cited

OTHER PUBLICATIONS

H. Lin, G. Rebeiz, "A 200-245 GHz Balanced Frequency Doubler with Peak Output Power of +2 dBm," CSICS, Oct. 2013, pp. 1-4, San Diego, CA.

K. Schmalz, et al., "245 GHz SiGe Transmitter with Integrated Antenna and External PLL," Microwave Symposium Digest, Jun. 2013, pp. 1-3.

Medvedev, et al., "Submillimeter spectroscopy for chemical analysis with absolute specificity," Optics Letters, May 2010, pp. 1533-1535, vol. 35, No. 10.

N. Sarmah, et al, "235-275 GHz (x16) Frequency Multiplier Chains with up to 0 dBm Peak Output Power and Low DC Power Consumption," Radio Frequency Integrated Circuits Symposium, 2014, pp. 181-184.

N. Sharma, et al., "160-310 GHz Frequency Doubler in 65-nm CMOS with 3-dBm Peak Output Power for Rotational Spectroscopy," Radio Frequency Integrated Circuts Symposium, Jul. 2016, pp. 186-189.

N. Sharma, et al., "85-to-127 GHz CMOS Transmitter for Rotational Spectroscopy," Custom Integrated Circuits Conference, 2014, pp. 298-301.

O. Momeni, E. Afshari, "A Broadband mm-Wave and Terahertz Traveling-Wave Frequency Multiplieron CMOS," IEEE Journal of Solid-State Circuits, Dec. 2011, pp. 2966-2976, vol. 46, No. 12.

W. Chan, J. Long, "A 60-GHz Band 2 2 Phased-Array Transmitter in 65-nm CMOS," IEEE Journal of Solid-State Circuits, Dec. 2010, pp. 2682-2695, vol. 45, No. 12.

Z. Wang, et al., "A CMOS 210-GHz Fundamental Transceiver With OOK Modulation," IEEE Journal of Solid-State Circuits, Mar. 2014, pp. 564-580, vol. 49, No. 3.

\* cited by examiner

WIDE BAND RECEIVER FRONT END FOR ROTATIONAL SPECTROSCOPY

BACKGROUND

Portable gas spectroscopy may useful in settings that include indoor or confined space air monitoring and breath analysis. Current technologies include either small devices that detect a limited number of gas types (such as for common roadside alcohol breathalyzer tests) or may lack sensitivity. Larger devices may be able to scan for a broader number of gas types, but their size and power consumption may make them undesirable in many environments.

As an overview of the technology, electro-magnetic waves in the millimeter and submillimeter wave frequency ranges can be used for fast scan rotational spectroscopy to detect gas molecules and measure their concentrations. FIG. 1 shows the principle behind rotational spectroscopy, in which a transmitter 100 such as a VDI transmitter radiates electromagnetic waves 105 within a certain frequency range into an absorption cell 110 containing gas molecules 115. The waves change the rotational state of gas molecules and a part of the wave power is lost in this interaction. These results in a drop of power picked up 125 at a receiver (RX) 120 such as a VDI receiver or a spike. By sweeping the transmitter (TX) 100 output frequency, a sweep controlled by a computer (not shown), the receiver 120 may measure the frequency response of the absorption cell 110. As shown in the frequency vs power absorption graph 140, looking at the frequencies at which the waves are absorbed and the depth of absorption line, the presence of a particular molecule and its concentration may be determined.

Rotational spectrometers use a frequency multiplier chain driven from a signal generated using a synthesizer to generate the transmitter signal, and a diode based sub-harmonic mixer followed by an amplifier and a diode amplitude detector to measure the received signal amplitude. The frequency multiplier chain, mixer and diode may be fabricated using compound-semiconductor technologies. Rotational spectroscopy at 240-250 GHz has been demonstrated using SiGe heterojunction bipolar transistor (HBT) based radio frequency (RF) front-ends for transmission and reception and a spectrometer that measures 200-300 GHz frequency waves uses III-V technology (obtained by combining group III elements (Al, Ga, In) with group V elements (N, P, As, Sb)) but is both expensive and bulky.

SUMMARY OF THE EMBODIMENTS

A receiver receives a wide band signal in a range comprising a front end to the receiver including a complementary metal-oxide-semiconductor (CMOS). The CMOS includes a dipole antenna that receives a received signal; a hybrid-based broadband isolation structure that receives the received signal and a local oscillator LO signal and passes through the LO signal to a sub-harmonic mixer. The sub-harmonic mixer mixes the received signal with the local oscillator signal to generate an intermediate frequency (IF) signal to the hybrid-based broadband isolation structure.

DETAILED DESCRIPTION OF THE EMBODIMENTS

Figure 1:
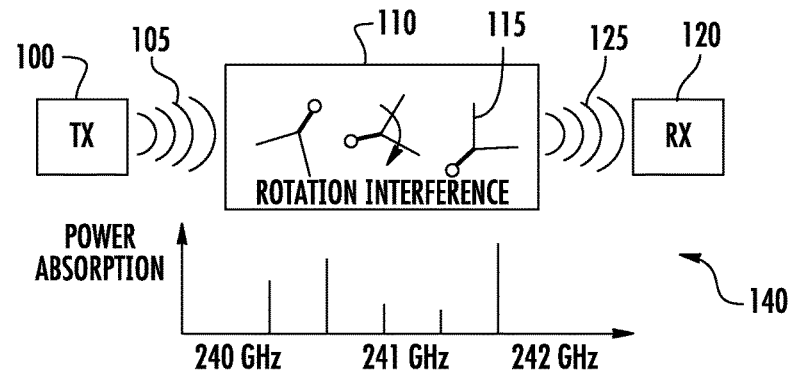
FIG. 1 shows a graphical overview of rotational spectroscopy.
Figure 2:
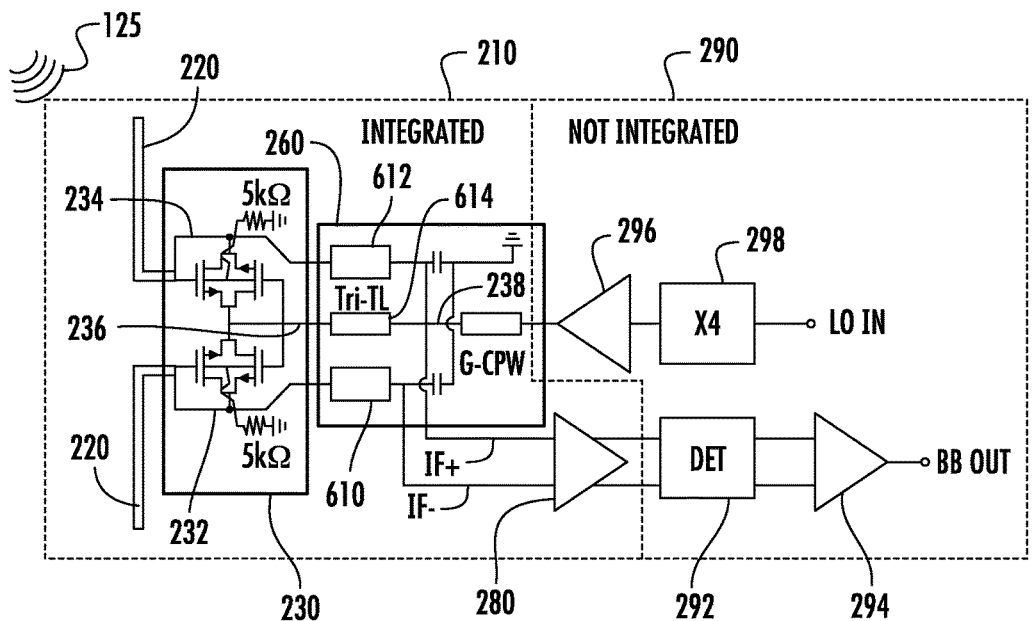
FIG. 2 shows a schematic for a front-end for rotational spectroscopy that includes a sub-harmonic mixer, an on-chip antenna and an intermediate frequency amplifier.

FIG. 2 shows a front-end receiver architecture 200 for rotational spectroscopy that includes an integrated system 210 and a non-integrated system 290. The integrated system 210 may use a complementary metal-oxide-semiconductor (CMOS) to conserve power and space and includes an on-chip dipole antenna 220, a sub-harmonic mixer 230 with a hybrid-based broadband isolation structure 260, and an intermediate frequency (IF) low noise amplifier 280.

The non-integrated system 290 may include an IF AM detector 292 connected to the IF low noise amplifier 280 and detector 292, which is itself connected to the baseband output 294. The local oscillator (LO) amplifier 296 that includes a frequency multiplier 298 connected to an LO input. Within this LO chain, the multiplier 298 takes input may receive input signals at 27-34 GHz and generates output signals at 110-145 GHz, although other frequencies are possible.

The LO driver may include two stages of neutralized differential common source stages to drive the LO port of the receiver front end 200 that requires 0-2 dBm power.

The receiver front end 200 and the integrated circuit 210 will be explained in more detail below, but in summary, the dipole antenna 220 detects a frequency of the emitted signal 125 to identify a power drop that corresponds to a certain gas in the absorption cell 110. It does this by processing, in the hybrid core 260, an amplified LO signal from the LO amplifier 296 and the emitted signal 125 received through the dipole antenna 220 processed through the subharmonic mixer 230, to generate to an IF signal to an IF amplifier 280, which in turn sends the IF amplified signal to a detector 292 that generates a detected output signal to a baseband output 294 to generate a baseband signal that can be analyzed by a controlling computer to determine the presence of a specific gas.

Dipole Antenna

Silicon on-chip antennas suffer from low gain and efficiency because of EM wave propagation into the silicon substrate. A way to mitigate this is to place a metal reflector at the backside of the chip to reflect the wave back into the air. By making the silicon thickness an odd multiple of one quarter wavelength (k/4), the reflected wave can be combined in-phase with the broadside radiation, improving the peak antenna gain.

Figure 3A:
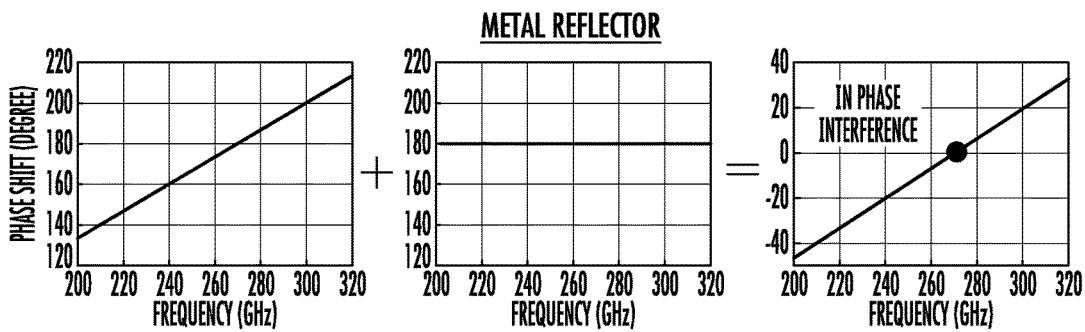
FIG. 3 shows detection comparisons between 3 antenna designs.
Figure 3B:
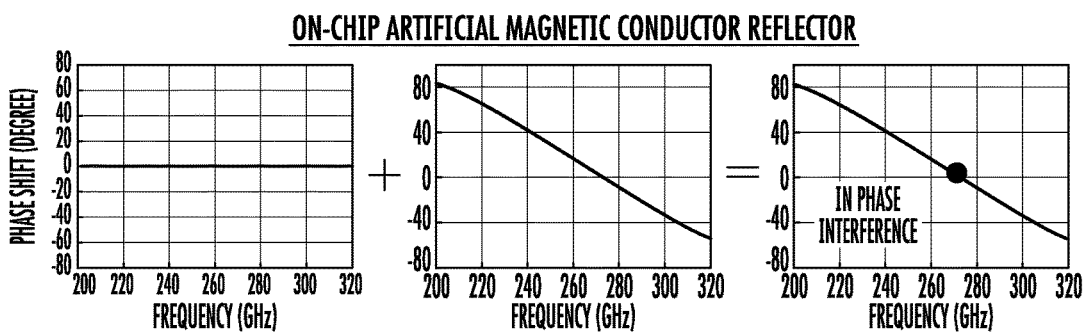
Figure 3C:
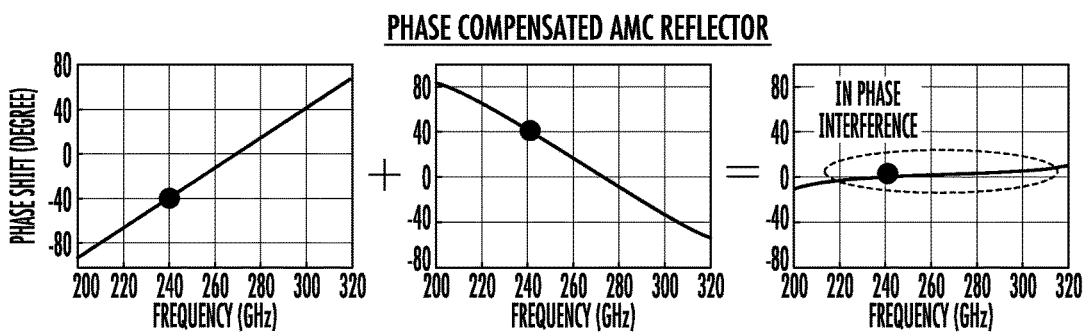

FIG. 3 shows detection comparisons between 3 antenna designs: (1) using a metal reflector assembly, (2) using an artificial magnetic conductor (AMC) reflector, and (3) using a phase-compensated AMC reflector. The three graphs for each assembly from left to right show the frequency vs phase shift measurements and their combined measurement for multiple phase shifts/frequencies. As can be seen for the metal reflector and AMC combined graph, the in-phase interference (the right-most graph varies with frequency, making them accurate only for a limited frequency. In contrast, the in-phase interference for a phase compensated AMC reflector has a near constant phase shift over a large frequency range, which makes it effective for use in a range from approximately 200-320 GHz.

Said another way, in the phase-compensated AMC construction, frequency responses of the phase shift due to the AMC and propagation through the substrate have opposite frequency dependences. When compensated, the phase shift can be kept less than +/−8° and makes the antenna efficiency to be within 0.5 dB of the peak efficiency between 200 to 300 GHz.

Figure 4:
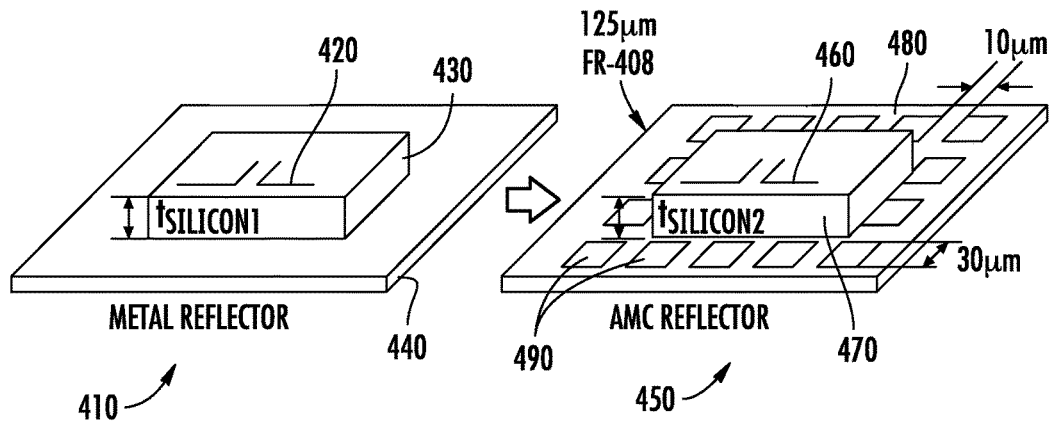
FIG. 4 shows a comparison between the metal reflector and phase-compensated AMC reflector.

FIG. 4 shows a comparison between the metal reflector 410 and phase-compensated AMC reflector 450. In the traditional metal reflector, an antenna 420 is mounted on a thickness of silicon 430 on top of the reflector 440. In the traditional construction, the silicon thickness is dependent on $k/4*\lambda$, where k is an odd integer and $\lambda$ is a wavelength of an incident wave.

This contrasts with the phase-compensated AMC reflector 450. In this construction, an antenna 460 is mounted on a thickness of silicon 470 on top of a reflector surface. The reflector 480 comprises spaced apart reflector portions 490. These reflector portions may have a dimension of 30 μm square spaced apart at 10 μm intervals. In this construction, the silicon thickness is dependent on $m/2*\lambda$, where m is an any integer, which allows for a wider range of thicknesses. This array of 30 μm×30 μm copper squares may be fabricated on a 125 μm-thick FR 408 PCB with a 1 μm-thick copper layer. The simulated peak gain of the on-chip dipole antenna with the PC-AMC may vary from −1 to 2 dB over the operating frequency range.

Subharmonic Mixer (Mixing Core)

Figure 5A:
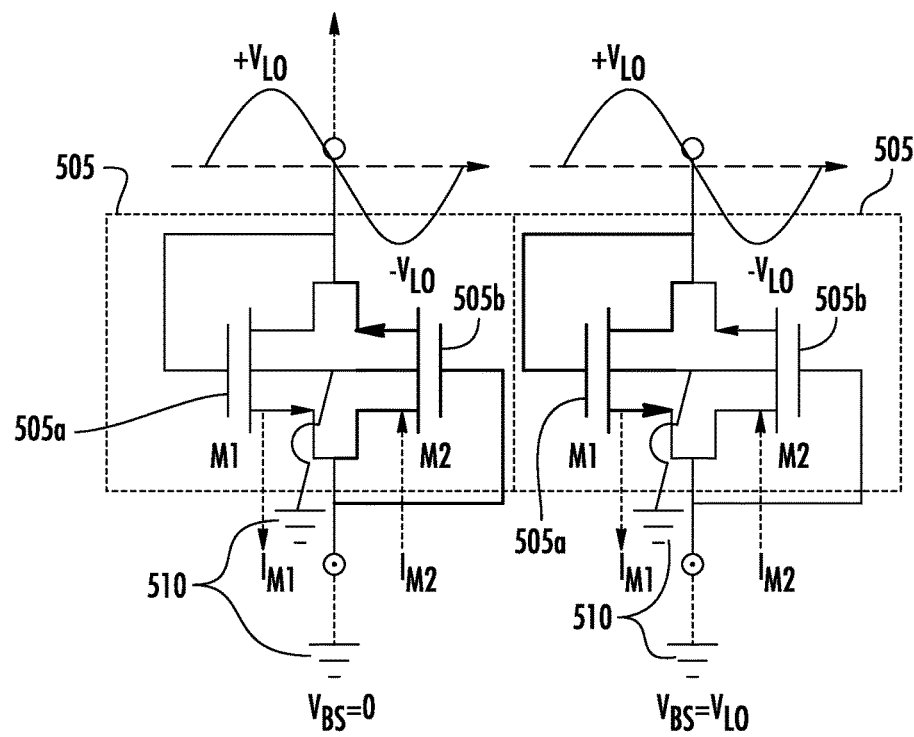
FIGS. 5A-5D show schematic diagrams of the mixer.

For sub-harmonic mixing, an anti-parallel diode pair (APDP) may be used because of its ability to reject even order mixed products. Although CMOS-compatible Schottky barrier diodes are available, diode-connected NMOS transistors biased in sub-threshold region may have better performance due to their symmetry in physical structure. As illustrated in FIG. 5A diode-connected transistors 505a, 505b of a grounded-body NMOS APDP (GB-APDP), through ground 510, experience different body-to source-voltage (VBS) or body effect.

Figure 5B:
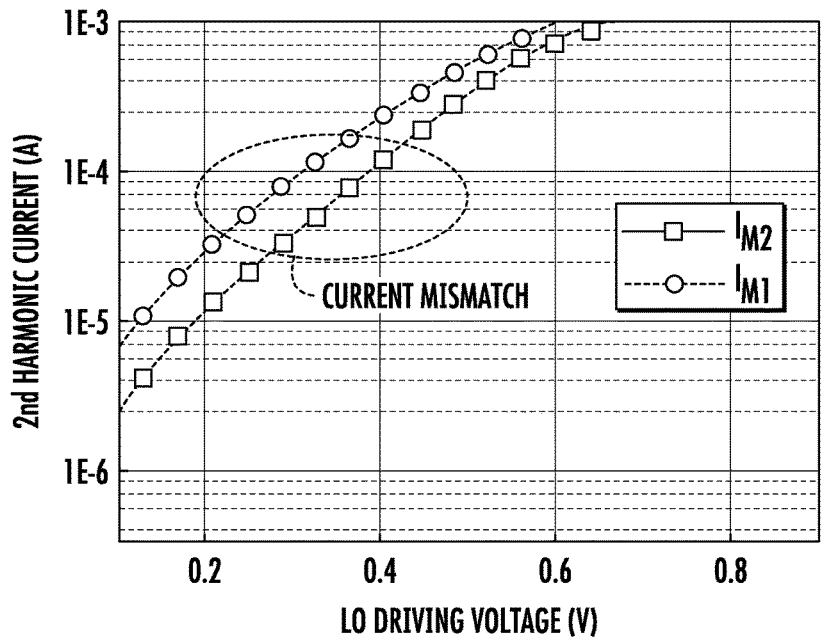

Because of this, even-order harmonics are not perfectly cancelled as shown in FIG. 5B, and increased conversion loss has been observed in simulations. To avoid these, a floating-body NMOS APDP (FB-APDP) may be used.

Figure 5C:
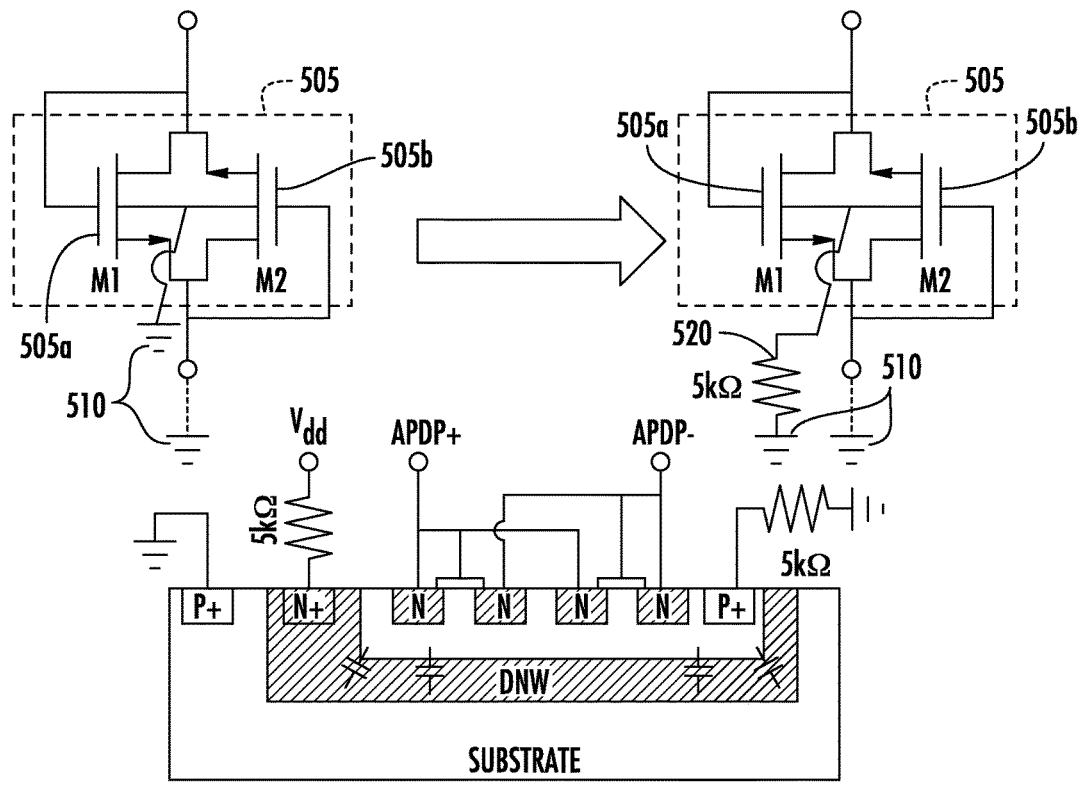

As shown in FIG. 5C, two triple-well NMOSFETs may be used to form the APDP structure. Instead of connecting the body terminal directly to the ground, a 5-kΩ resistor 520 (or other large resistance resistor) is inserted between the ground 510 and body node to AC isolate or float the body node. In operation, a strong voltage LO will create a replica on the body terminal letting the body closely track applied LO voltage. his allows for the body voltage to track the LO drive through the parasitic coupling and the source-to-body voltages of both MOSFETs to be kept the same over an entire LO cycle. FIG. 5C also shows a conceptual substrate including a possible circuit design as discussed.

Figure 5D:
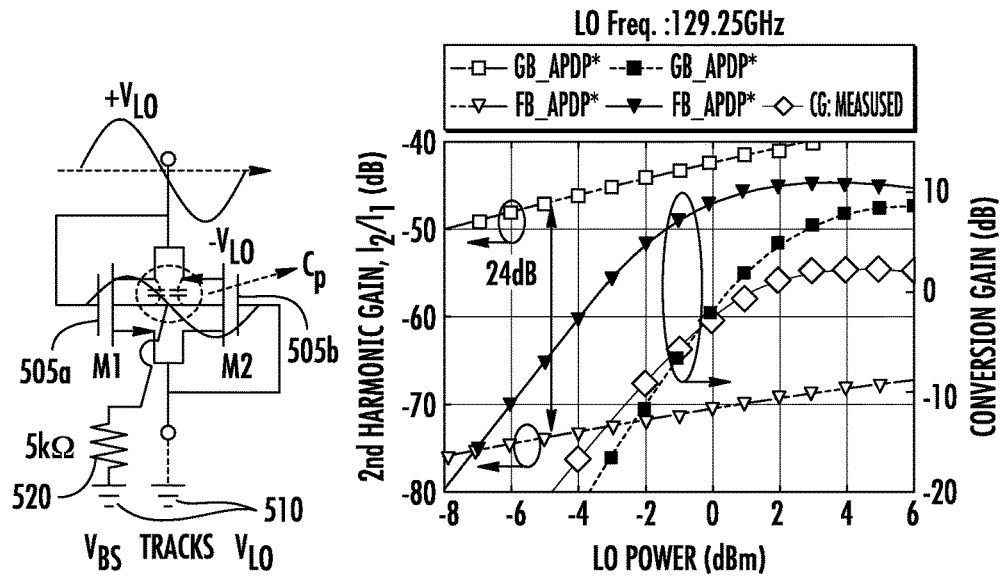

The effectiveness of floating body connection can be clearly seen through simulations results in FIG. 5D that show that the undesired second harmonic current, which can decrease sub-harmonic conversion efficiency and increase noise "folding" effect by creating strong fundamental mixing term may be rejected by more than 24 dB and at given conversion gain, and ~4 dB lower LO power may be needed.

Wideband Hybrid

Figure 6:
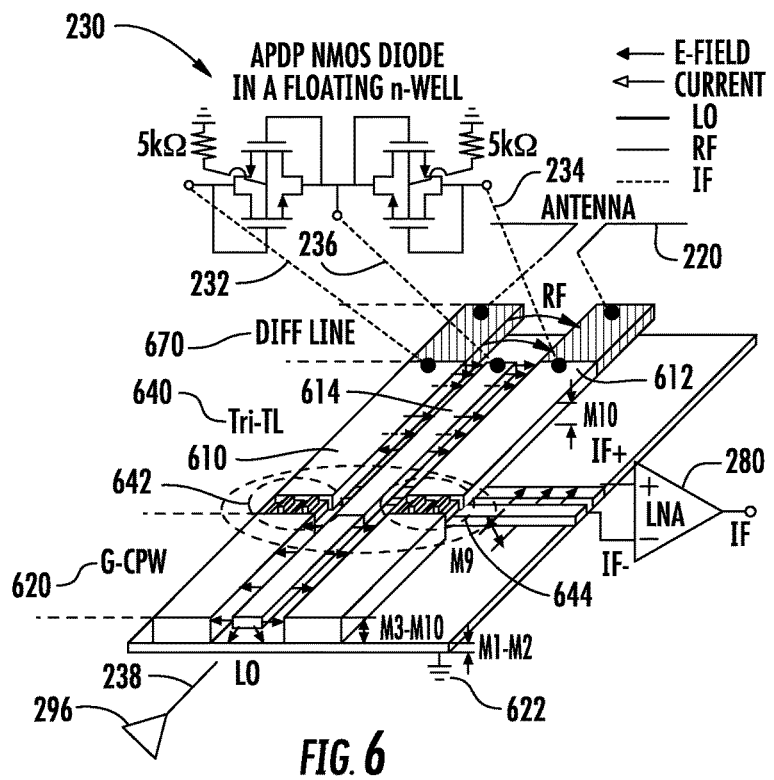
FIG. 6 is a schematic depiction of the hybrid structure.

FIG. 6 shows a wideband hybrid structure 260 that provides port isolation and impedance matching over a 200-300 GHz frequency range. Conventional hybrid designs relying on λ/4-transmission lines are narrow-band. For designs using the wideband hybrid structure 260, RF and LO signals from the antenna 220 and LO amplifier 296 respectively are isolated by using different modes in a three-line 610, 612, 614 transmission line (Tri-TL) that simultaneously supports both even and odd mode propagation.

The hybrid structure 260 may be seen as having a grounded coplanar waveguide 620, Tri-TL 640, and differential line 660. The differential line interfaces to an on-chip differentially-fed dipole antenna operating in odd mode. The coplanar waveguide interfaces to single-ended LO chain operating in even mode. The Tri-TL supports both odd and even mode simultaneously which enables LO and RF signal mixing.

The RF signal received using a differentially fed on-chip dipole antenna 220 is delivered to the floating body anti parallel diode pair (FBAPDP) mixing core 230 in an odd mode through the Tri-TL transmission lines 610, 612, 614. As can be seen in both FIG. 2 and FIG. 6, the antenna 220 and mixing core 230 are connected to the hybrid structure transmission lines 610, 612, and 614 by lines 232, 234, and 236 respectively.

The LO amplifier 296 generates a single-ended LO signal that is fed through line 238 to a grounded coplanar waveguide (GCPW) 620 and delivered to the hybrid 260 through the Tri-TL structure 640 in even mode. Wideband isolation between RF and LO signals is achieved because the feed structure of one cannot support the mode of the other. To isolate the IF path 660 to the low noise amplifier 280 from the hard short provided by the ground 622 of the GCPW 620, two 80-fF metal oxide-metal capacitors 642, 644 may be inserted into the ground path of LO GCPW 620. This capacitance serves as a short for RF and LO signals and absorbed into an IF matching network. Since the IF signal is extracted from the node at which LO and RF signals are AC grounded, a high-Q IF matching network may be implemented without affecting the LO and RF matching. High-Q Matching network is intended to optimize the noise and power gain performance of IF LNA which would be otherwise difficult without the current configuration.

In testing, this hybrid structure 260 may provide over a 100-GHz bandwidth detection capabilities with less than 1-dB transmission loss with isolation between all ports exceeding 50 dB.

Structurally, layers M1-2 support the base structure, M3-10 support the transmission lines 610, 612 in the GCPW 620, M9 supports the IF lines IF+, IF−, and M10 supports the RF differential input from the antenna 670, and the LO line 614 at the GCPW 620, Tri-TL 640, and differential 670, and the RF lines 610, 612 at the tri-TL 640 and differential 670.

FIG. 6 graphically shows the IF signal IF, RF signal RF, LO signal LO, current Current, and e-field E-field for illustration purposes to show both isolation and connection.

While the invention has been described with reference to the embodiments above, a person of ordinary skill in the art would understand that various changes or modifications may be made thereto without departing from the scope of the claims.

The invention claimed is:

1. A receiver for receiving a wide band signal in a range comprising a front end to the receiver comprising a complementary metal-oxide-semiconductor (CMOS) comprising:
   a dipole antenna that receives a received signal;
   a hybrid-based broadband isolation structure that receives the received signal and a local oscillator LO signal and passes through the LO signal to a sub-harmonic mixer; and the sub-harmonic mixer that mixes the received signal with the local oscillator signal to generate an intermediate frequency (IF) signal to the hybrid-based broadband isolation structure.

2. The receiver of claim 1, wherein the dipole antenna's phase interference has a near constant phase shift over a frequency range from 200 to 300 GHz.

3. The receiver of claim 1, wherein the dipole antenna is mounted on a thickness of silicon, which is mounted on a reflector.

4. The receiver of claim 3, wherein the reflector comprises spaced-apart reflector portions mounted on a reflector surface.

5. The receiver of claim 4, wherein the spaced apart reflector portions are 30 μm square and spaced apart at 10 μm intervals.

6. The receiver of claim 3, wherein the thickness of silicon has a thickness dependent on $m/2*\lambda$, where m is an any integer, and $\lambda$ is a wavelength of an incident wave.

7. The receiver of claim 1, wherein the sub-harmonic mixer comprises an anti-parallel diode pair (APDP).

8. The receiver of claim 7, wherein the APDP comprises diode-connected transistors, wherein at least one of the diode connected transistors is connected directly through a ground.

9. The receiver of claim 8, wherein the APDP comprises diode-connected transistors, wherein another of the at least one of the diode connected transistors is connected to a ground through a resistor.

10. The receiver of claim 9, wherein the resistor is a 5 kΩ resistor.

11. The receiver of claim 1, wherein the hybrid-based broadband isolation structure provides port isolation and impedance matching over a 200-300 GHz frequency range.

12. The receiver of claim 1, wherein the hybrid-based broadband isolation structure comprises a grounded coplanar waveguide (GCPW), three-line transmission line (Tri-TL), and differential line, wherein the dipole antenna is connected to each of two of the transmission lines and the sub-harmonic mixer is connected to all of the transmission lines.

13. The receiver of claim 12, wherein the grounded coplanar waveguide is fed by an LO signal.

14. The receiver of claim 13, wherein the LO signal is delivered in even mode.

15. The receiver of claim 14, wherein the differential line is fed by the emitted signal.

16. The receiver of claim 15, wherein the emitted signal and the LO signal are isolated from one another.

17. The receiver of claim 16, wherein the emitted signal and LO signal are isolated from one another using two capacitors inserted into a ground path of the GCPW, wherein the capacitors serve as a short for emitted and LO signals.

18. The receiver of claim 17, wherein the IF signal is sent to a low noise amplifier, which amplifies the IF signal and sends the amplified IF signal to an IF detector, and then to a baseband output.

19. A rotational spectrometer for identifying gas molecules comprising:
   a transmitter that radiates electromagnetic waves into an absorption cell containing gas molecules, wherein the electromagnetic waves change a rotational state of the gas molecules and absorb some of the wave power that can be seen as a drop in power; and
   front end receiver the detects the drop in power as a wide band signal, the front end to the receiver comprising a complementary metal-oxide-semiconductor (CMOS) comprising:
   a dipole antenna that receives the wide band signal as a received signal;
   a hybrid-based broadband isolation structure that receives the received signal and a local oscillator LO signal and passes through the LO signal to a sub-harmonic mixer; and
   the sub-harmonic mixer that mixes the received signal with the local oscillator signal to generate an intermediate frequency (IF) signal to the hybrid-based broadband isolation structure.
   wherein the IF signal is sent to a low noise amplifier that amplifies the IF signal and sends the amplified IF signal to an IF detector, and then to a baseband output, wherein the baseband out signal that can be analyzed by a controlling computer to correspond the baseband output to a known drop in power corresponding to a specific gas.

20. The rotational spectrometer of claim 19, wherein the rotational spectrometer can be used to detect signals and identify gas molecules over a frequency range from 200 to 300 GHz.

* * * * *